March 30, 1965  W. R. KEE  3,175,469
HYDRAULIC CAM MOTOR VANE SWITCHING SYSTEM
Filed Dec. 14, 1962  3 Sheets-Sheet 1

INVENTOR
William R. Kee

BY Claude Funkhouser
ATTORNEY

March 30, 1965  W. R. KEE  3,175,469

HYDRAULIC CAM MOTOR VANE SWITCHING SYSTEM

Filed Dec. 14, 1962  3 Sheets-Sheet 2

March 30, 1965     W. R. KEE     3,175,469
HYDRAULIC CAM MOTOR VANE SWITCHING SYSTEM
Filed Dec. 14, 1962     3 Sheets-Sheet 3

United States Patent Office 3,175,469
Patented Mar. 30, 1965

3,175,469
HYDRAULIC CAM MOTOR VANE SWITCHING SYSTEM
William R. Kee, Oak Park, Mich., assignor, by mesne assignments, to the United States of America as represented by the Secretary of the Navy
Filed Dec. 14, 1962, Ser. No. 244,846
2 Claims. (Cl. 91—104)

The present invention relates to means for maintaining vanes in vane-type hydraulic power converters in contact with the cam rotor. More particularly, the present invention relates to means for applying and maintaining pressure on the top surface of the vanes in a vane-type hydraulic power converter when the power converter is in operation, and for switching the applied pressure when the rotor is reversed in its direction of rotation so that the vane will be maintained in contact with the rotor at all times.

In vane-type fluid power converters of a character preferably utilizing hydraulic fluid such as those of the type disclosed by J. R. Farron et al. in Patent No. 2,845,872, it is often desirable to design the power converter to reverse the direction of rotation of the output shaft connected thereto by reversing the direction of flow of hydraulic fluid from the supply source to the pressure ports conducting pressurized fluid to the rotor. The process by which these converters are reversed is called "switching." This reversal requires not only a change in pressure sources to drive the cam lobes on the rotor in the opposite direction, but it is also desirable to constantly apply pressure to the top surface of the vanes to keep them firmly in contact with the rotor, thereby minimizing leakage and promoting faster build-up of pressure for optimum response, stiffness, and torque output.

Therefore, it is an object of the present invention to provide means for maintaining pressure on the top surface of the vanes in vane-type hydraulic power converters to thereby maintain the vanes in contact with the rotor.

It is a further object of the present invention to provide means for maintaining the vanes of vane-type fluid power converters in contact with the converter rotor by application of pressure to the top surface of the vanes and for switching the application of pressurized fluid when the power converter is reversed in its direction of output rotation.

It is another object of the present invention to provide a fluid pressure responsive means for maintaining the vanes of vane-type hydraulic power converters in contact with the converter rotor by applying a part of the converter operating pressurized fluid to the top surface of the vane, and for switching the application of pressurized fluid when the operating pressure of the fluid in the converter is reversed in order to reverse the direction of operation of the power converter.

Other objects, advantages and novel features of the instant invention will become apparent from the following detailed description of the invention when considered in conjunction with the accompanying drawings wherein:

FIG. 2a is a diagrammatic view in vertical section taken along the line 2a—2a of FIG. 1a;

Figure 1A:
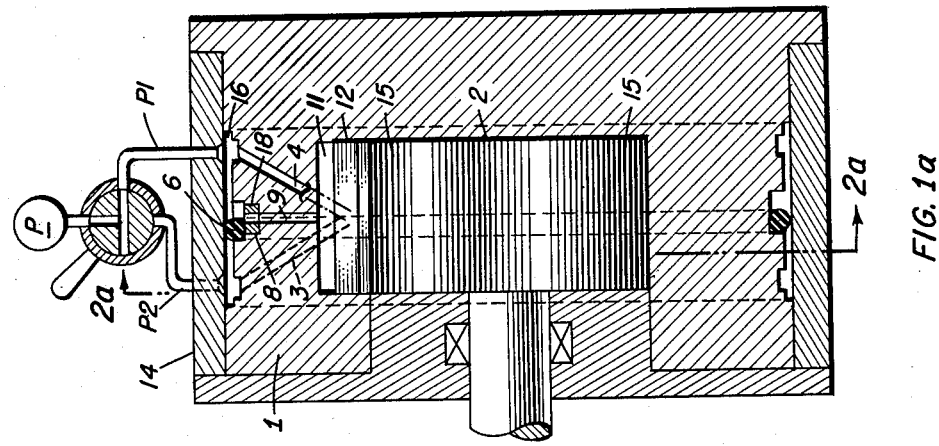
FIG. 1a is a diagrammatic view in section of one embodiment of the present invention taken through a typical power converter showing in diagrammatic form the relationship of the various parts of the invention.
Figure 2A:
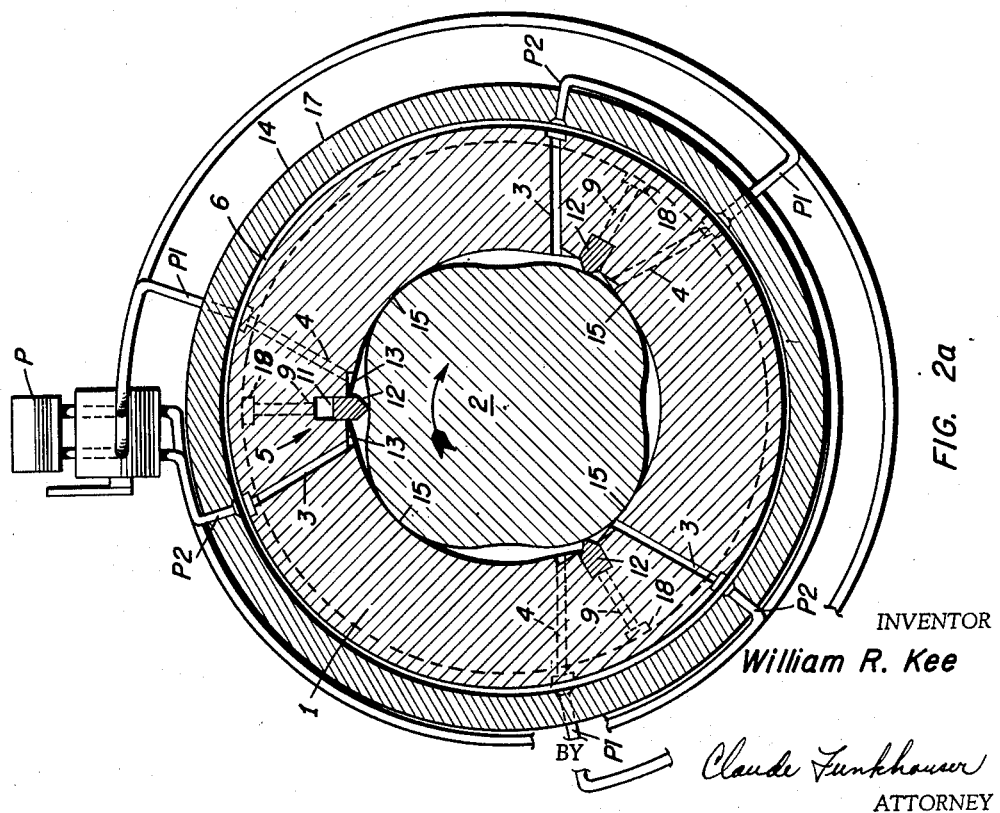
Figure 1B:
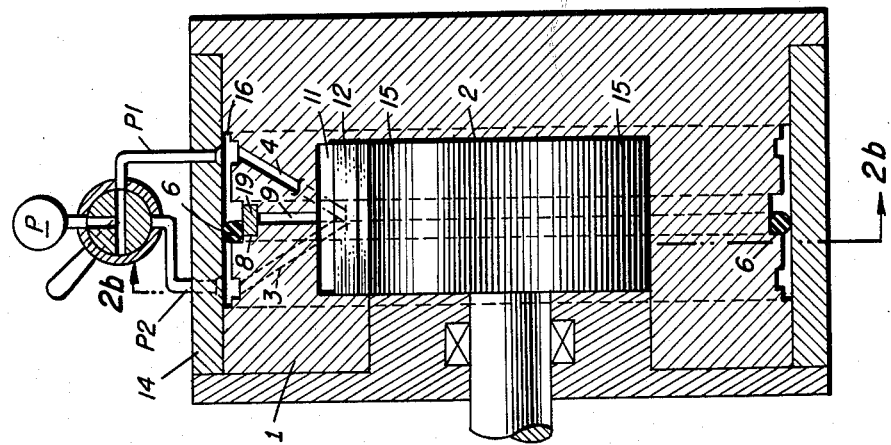
FIG. 1b is a view similar to FIG. 1a of a second embodiment of the present invention.
Figure 2B:
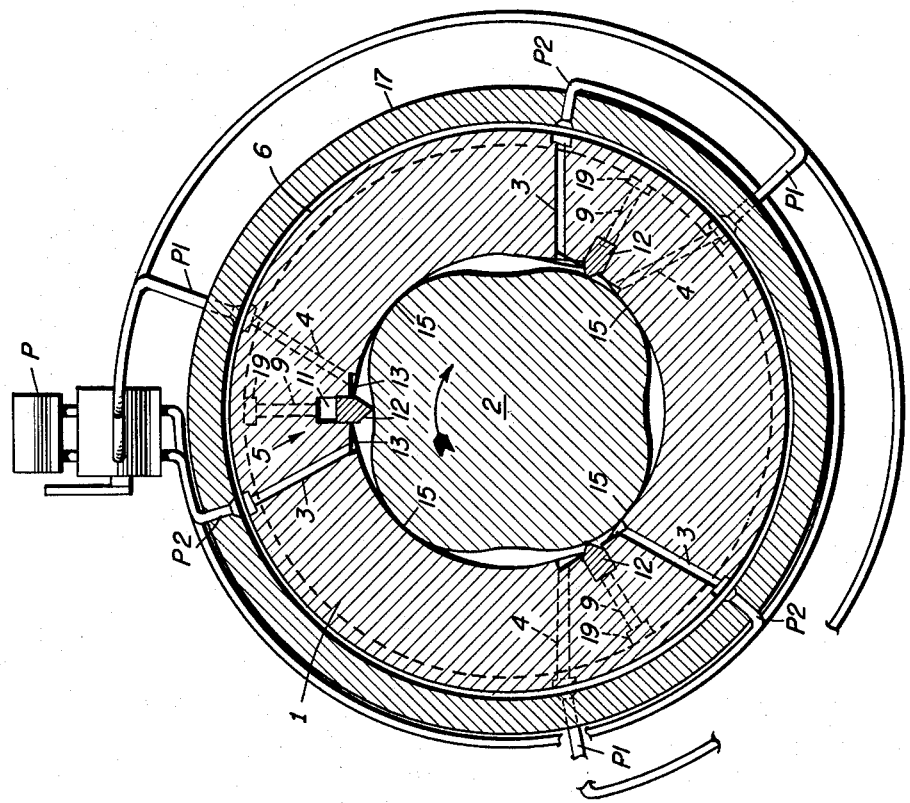
FIG. 2b is a diagrammatic view of a fragmentary portion of the embodiment of the present invention of FIG. 1b taken along the line 2b—2b of FIG. 1b and showing in a manner similar to that of FIG. 1a, a sectioned illustration of a typical vane-type hydraulic power converter.
Figure 3:
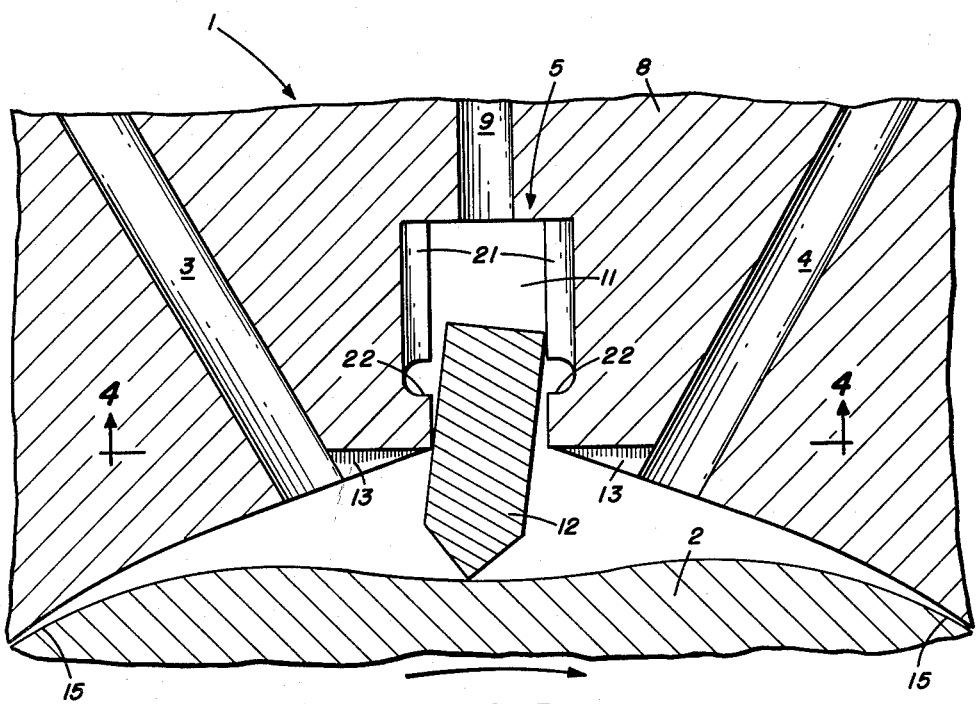
FIG. 3 is an enlarged broken view of the vane and vane chamber arrangement of FIG. 2b.
Figure 4:
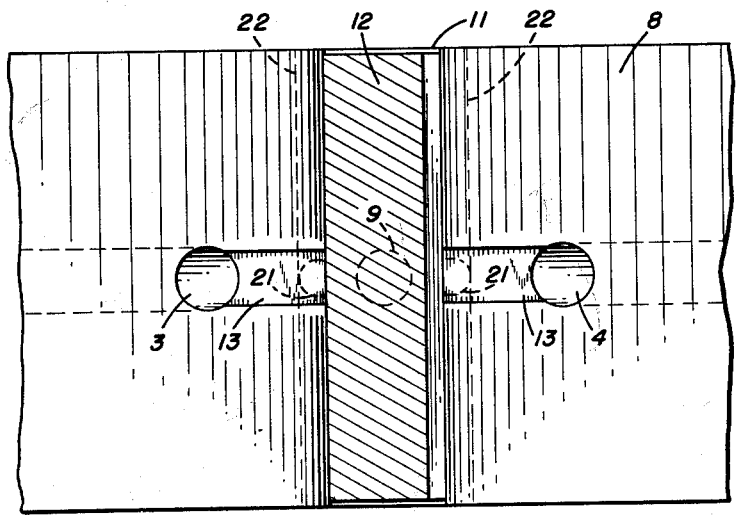
FIG. 4 is an enlarged sectional view taken along line 4—4 of FIG. 3 showing the relative position of the vane, vane chamber, and pressure passages.

Referring now to the drawings in which like reference numerals refer to like parts; there is shown in FIGS. 1a and 2a, a sectional view of a typical vane-type hydraulic power converter, having a case 1, a rotor 2, pressure passages 3 and 4, and vane assembly 5. The vane sealing system as embodied in the present invention comprises at least two embodiments as shown generally in FIGS. 1a and 1b, and FIGS. 2a and 2b. FIGS. 1a and 2a show a vane sealing system generally designated as an O-ring switching system. FIGS. 1b and 2b disclose a vane sealing system designated as a "vane switching system."

Referring now to FIGS. 1a and 2a, vane system 5 comprises an O-ring 6, outer O-ring groove 7, inner O-ring groove 8, pressure passage 9, vane chamber 11, vane 12, and pressure release grooves 13. An annular passage 16 between case 1 and housing 14, as shown in FIGS. 1a and 2a provides a pressure passage between pressure passage 3 and O-ring 6 on one side and pressure passage 4 and O-ring 6 on the other side. These two passages are sealed relative to each other by action of O-ring 6. As shown, the vane hydraulic power converter is operating with the rotor having a clockwise rotation. In this mode of operation, pressure passages 4 act to conduct fluid P1 under high pressure from a source of hydraulic fluid, generally indicated as a pump at P toward the rotor lobes beneath the passage, while pressure passages 3 exhaust fluid at a lower pressure as the exhaust chamber undergoes a decrease in its volumetric capacity as the leading side of the rotating rotor lobe moves toward the vane. As can be seen by reference to FIG. 2a, as the rotor rotates, the chamber defined by the high pressure side of vane 12, between the case 1 and rotor 2, undergoes a volumetric increase as the trailing side of the cam lobes 15 move away from vane 12 under the influence of the highly pressurized fluid in pressure passages 4. The chambers beneath the exhaust pressure passages 3 are compressed as cam lobes 15 move toward vane 12 so that any entrapped fluid P2 within the chamber is displaced and exhausted from pressure passages 3. It is apparent that in the absence of the incorporation of the structural embodiment of the present invention directed to the structure generally indicated at 5, the combination of the increasing pressure due to the compression of fluid in the chambers between the pressure passages 3 and the high pressure entering through pressure passages 4 would tend to exert an upward force on vane 12 and thereby lift the vane from contact with the rotor, short-circuiting high pressure fluid from high pressure passages 4 to low pressure passages 3 beneath the vane.

In the embodiment of the present invention, shown in FIGS. 1a and 2a, the high pressure fluid P1 entering pressure passages 4 is also conducted through annular passage 16 to O-ring 6 to thereby disengage O-ring 6 from its sealing relationship with respect to pressure passage 9. It is to be noted that inner O-ring groove 8 has been reduced in size by insertion of ported metal member 18. This modification is only necessary when existing vane-type hydraulic power converters are modified to include the present invention. If an entire vane-type hydraulic power converter were to be designed to initially incorporate the inventive concept of the present invention, it will be apparent that inner O-ring groove 8 would be designed so that the ported metal member 18 would not be necessary. Upon disengagement of O-ring 6 from the entrance of pressure passage 9, a part of the high pressure fluid from pressure passage 4 is conducted down pressure passage 9 into vane chamber 11. The high pressure fluid P1 in vane chamber 11 acts on the top surface of vane 12 to exert a downward force on vane 12 to thereby maintain it in contact with rotor 2. The sealed contact between vane 12 and rotor 2 maintains a pressure differential with respect to the exhaust side of the lobe 15 between the chambers located in the space between the casing 1 and the rotor 2.

In operation, the rotor rotates in a clockwise direction under the influence of high pressure fluid P1 entering the chambers beneath pressure passages 4. As the rotor rotates in a clockwise direction, the chambers located beneath pressure passages 4 undergo a volumetric increase due to the movement of rotor cam lobes 15 away from vane 12, and the chambers beneath exhaust passages 3 undergo a volumetric decrease due to movement of cam lobe 15 toward vane 12. It is to be noted that, in the absence of the present invention, the structural embodiment of the combination of the increasing pressure on one side of vane 12 due to the compression of the fluid within the compressed chambers and the high pressure fluid P1 entering the expanding chambers beneath pressure passages 4 on the other side of vane 12 would tend to raise the vane 12 from engagement with the rotor 2. However, the high pressure fluid P1 on the top surface of vane 12, due to the operation of the present invention, maintains vane 12 in contact with rotor 2. The vane-type hydraulic power converter is reversed in direction by switching valve V in a manner whereby the application of the high pressure fluid P1 from pressure passage 4 to pressure passages 3 together with a converse porting of the exhausting fluids P2 to the low pressure return or drain line 4 is accomplished. Annular passage 17 conducts a part of the high pressure fluid P1 now flowing in lines indicated at P2 into pressure passages 3, thence to O-ring 6, thereby to switch O-ring 6 across outer O-ring groove 7 for conduction of high pressure fluid P1 from annular passage 17 into chamber 9 and conversely fluid P2 is now flowing in lines indicated as P1. Due to the switching action on O-ring 6, pressure is maintained on the top surface of vane 12 even during reversing action of the motor. The embodiment of the present invention, as shown in FIGS. 1a and 2a, provides for switching by valve V of the applied pressure from the normally high pressure passage 16 to the normally low pressure passage 17 at the same moment the high pressure fluid is switched from the normally high pressure passages 4 to the normally low pressure passages 3 to reverse the direction of rotation of the rotor to thereby maintain sufficient pressure on the top surface of vane 12 to bias it downward into engagement with rotor 2. In this embodiment, high-pressure fluid from one or the other of the two pressure ports is gated to the vane chamber 11 by induced lateral movement of O-ring 6 in its outer groove 7 in response to pressure differentials between pressure passages 3 and 4. Minimal clearance between vane 12 and vane chamber 11 keeps vane 12 in a vertical position while permitting up and down movement of the vane as it follows the contours of the rotor cam.

A second embodiment of the present invention is shown in FIGS. 1b and 2b through 4. In this embodiment of the present invention, vane 12 itself serves as the switching mechanism to port either pressure passages 4 or pressure passages 3 to the vane chambers 11 above vanes 12 depending upon the direction of rotation of the rotor. As compared to the O-ring method, somewhat greater clearance of the vanes in their slots is essential (0.001 in. versus 0.0002 in.). This increased clearance provides vane pressurization by allowing high-pressure fluid to reach the vane chamber along the sides of the vanes. It is deemed apparent by reference to FIG. 1b, that the requirement for O-ring switching may be eliminated by insertion of metal seal 19 into inner O-ring groove 8. As mentioned in the description of the embodiment of the invention shown in FIGS. 1a and 2a, this seal is not necessary if the entire vane-type hydraulic power converter is so designed as to initially include structural details configured to incorporate the inventive concept of the present invention. Obviously, in such a case, metal seal 19 and pressure passage 9 are not necessary in the present embodiment of the invention as shown in FIGS. 1b and 2b. However, vane-type hydraulic power converters may be designed to use alternatively either embodiment of the present invention by use of the metal seal 19, or the combination of the two embodiments may be incorporated into the same converter. As is readily apparent by reference to FIGS. 2b and 3, the direction of rotation of the vane-type hydraulic power converter is clockwise which indicates that high pressure fluid enters pressure passages 4 to act on cam rotor 2. Under the influence of the high pressure fluid in pressure passages 4, vanes 12 are shifted at their point of contact with respect to cam rotor 4 in a direction toward the low pressure chamber beneath pressure passages 3. As a result of the shifting of the points of contact of vanes 12 with respect to rotor 2, the side of the vanes closest to exhaust pressure passages 3 seal vane chambers 11 from passage of fluid into the chamber beneath pressure passages 3. On the other hand, the side of vanes 12 closest to pressure passages 4 is moved away from the vane chamber walls so that high pressure fluid passes from the chambers beneath pressure passages 4 along the side of vanes 12 into the portion of vane chambers 11 above vanes 12. Grooves 21 and 22 are provided in the walls of vane chambers 11 to provide for lubrication of vanes 12 as well as to provide for equal pressure on the sides of vanes 12 within vane chambers 11. It is to be noted that some of the high pressure fluid will leak through grooves 21 into the low pressure chambers below pressure passages 3, but this leakage is not considered sufficiently significant to adversely affect in any way the operation of the apparatus embodying the present invention. When it is desired to reverse the direction of the rotation of rotor 2, the high pressure fluid entering pressure passages 4 is switched by valve V to pressure passages 3. Since the construction of the reversing valve is of a conventional nature well-known in the art, the details of the structure thereof are not herein described as they form no part of the instant invention. The diagrammatic representation thereof is presented merely for purposes of illustration and to facilitate a better understanding of the instant invention. Upon this switching, the rotor 2 reverses its direction of rotation and pressure passages 3 become the high pressure passages while pressure passages 4 become the exhaust or drain passages. At the moment high pressure fluid enters pressure passages 3, the portions of vanes 12 in contact with rotor 2 are shifted toward pressure passages 4 so that they engage the vane chamber walls closest pressure passages 4 in a sealing relationship while the portions of the vanes closest pressure passages 3 are moved away from the vane chamber walls to conduct high pressure fluid to the top of vane chambers 11 to thereby induce movement of the vanes in a downward direction into engagement with rotor 2. This embodiment of the present invention provides a rapid response switching means for switching the application of fluid under high pressure from an external flow reversing valve V in a manner to induce movement of vanes 12 into engagement with rotor 2 and from one group of pressure passages to the other when the direction of rotation of the rotor 2 is desired to be reversed.

To achieve positive pressurization of all vanes, each vane must remain in contact with the rotor cam 2 under all operating conditions. If the vane lifts, high pressure fluid is short-circuited to low pressure fluid causing loss of motor torque and stiffness in proportion to such leakage. Pressure relief grooves 13 are incorporated in the vane-type fluid power converter to facilitate the escape of fluid preferably of a hydraulic type which might become trapped against the vane and be thereby trapped upon the approach of a lobe 15 of cam rotor 2 when the motor is desired to be reversed in direction. If fluid does become trapped against the vane, instantaneous lift will occur when the converter is reversed in its direction of rotation. Therefore, the pressure relief grooves 13 are incorporated in a manner as illustrated, for the purpose of prevention of vane lift.

It is thus apparent that the present invention incorporates instrumentalities for maintaining the vanes of the vane-type hydraulic power converters continuously in a sealing engagement with the rotor thereby to obviate any tendency toward short-circuiting of high pressure fluid from the high pressure passages to the low pressure passages. The invention also provides instrumentalities for switching the application of the fluid under pressure acting on the vanes at the same instant the converter is caused to reverse its direction of rotation.

Obviously many modifications and variations of the present invention are possible in the light of the above teachings. It is therefore to be understood that within the scope of the appended claims the invention may be practiced otherwise than as specifically described.

What is claimed is:
1. In a hydraulic power converter the combination comprising at least one of
  a rotor member; and
  a stator member;
  said rotor member having a plurality of cam lobes and an equal number of dwell portions on the outer periphery thereof;
  said stator member having substantially a surface of revolution providing for formation of a substantially fluid-tight engagement relationship with a portion of the peripheral surfaces of said cam lobes;
  means providing a plurality of pressure chambers located between said rotor member and said stator member, said pressure chambers being formed by the dwell portions in said rotor member and being sealed by the engagement of the cam lobes on said rotor member on the periphery thereof with the surface of revolution of said stator member;
  a plurality of vane chambers in the stator member;
  said vane chambers being one less in number than the number of cam lobes on said rotor and having one side opening toward the rotor member;
  vane type cam follower members each individual to and slidably located within said vane chambers, and further characterized by having a bottom portion configured to engage the outer surface of said rotor member along a portion of the surface thereof in a direction parallel to the axis of rotation of said rotor and having a top portion so disposed within said vane chamber as to receive pressurized fluid upon the outer surface thereof in a manner to bias said vane member toward said rotor member;
  said vane cam follower member being slidable within said vane chamber for engagement with said rotor member thereby to separate each of said pressure chambers into a first and a second portion;
  the first portion of each of said pressure chambers forming a chamber for reception of fluid under high pressure when said rotor member is rotating in a clockwise direction and forming a chamber for exhausting less highly pressurized fluid when said rotor member is rotating in a counter-clockwise direction;
  the second portion of each of said pressure chambers forming a chamber for exhausting less highly pressurized fluid when said rotor member is rotating in a clockwise direction and a chamber for reception of fluid under high pressure when said rotor member is rotating in a counter-clockwise direction;
  first pressure passages opening into each of said first and second portions of said chambers and communicating through said stator member to a source of hydraulic fluid;
  means including an O ring for selectively applying pressure through said pressure passages in either said first or said second portions of said chambers to thereby change the direction of rotation of said rotor member;
  second pressure passages located above said vane chamber and communicable with a source of hydraulic fluid; and
  said last-mentioned means further comprising switch means including, structure forming a port disposed in a cooperative relationship with said O ring and located in said second pressure pasasges in a manner to be operably connected to said vane chambers to maintain pressure on the top of said vane when said rotor is changed from one direction of rotation to the opposite direction of rotation.

2. A hydraulic power converter of the character defined in claim 1 wherein:
  each of said second pressure pasasges comprises an annular passage adapted to connect said first pressure passages;
  a fluid conduit connecting said annular passages to said vane chambers;
  an O ring groove joining said annular passage to said fluid conduit; and
  said switch means being so disposed as to be cooperative with said O ring in a manner whereby the O ring is positioned within said O ring groove and movable from one side of said O ring groove to the other side thereof under the influence of the highly pressurized fluid in said annular groove thereby to block said annular groove and shunt the fluid from said annular groove to said vane chamber through said fluid conduit and to switch the application of pressurized fluid in the vane chamber from one of said pressure passages to the other above each vane chamber when the direction of rotation of said rotor is desired to be reversed.

References Cited by the Examiner

UNITED STATES PATENTS

| 793,660 | 7/05 | Hinden | 91—104 |
| 807,421 | 12/05 | Dickison | 103—123 |
| 920,976 | 5/09 | Minor | 103—136 |
| 2,786,421 | 3/57 | Prendergast | 103—123 |
| 3,016,021 | 1/62 | Rineer | 103—123 |

FOREIGN PATENTS

| 346,020 | 3/31 | Great Britain. |

JOSEPH H. BRANSON, JR., *Primary Examiner.*
WILBUR J. GOODLIN, *Examiner.*